(12) United States Patent
Southerland et al.

(10) Patent No.: US 7,461,197 B2
(45) Date of Patent: Dec. 2, 2008

(54) DISK FORMATTER AND METHODS FOR USE THEREWITH

(75) Inventors: Bob R. Southerland, Longmont, CO (US); John Mead, Longmont, CO (US); Kevin W. McGinnis, Berthoud, CO (US)

(73) Assignee: Broadcom Corporation, Irvine, CA (US)

( * ) Notice: Subject to any disclaimer, the term of this patent is extended or adjusted under 35 U.S.C. 154(b) by 233 days.

(21) Appl. No.: 11/311,728

(22) Filed: Dec. 19, 2005

(65) Prior Publication Data

US 2007/0143525 A1 Jun. 21, 2007

(51) Int. Cl.
*G06F 12/00* (2006.01)
(52) U.S. Cl. .................. 711/4; 711/111; 711/154; 711/200; 360/77.04
(58) Field of Classification Search .......... 711/4, 711/111, 154, 200; 360/77.04
See application file for complete search history.

(56) References Cited

U.S. PATENT DOCUMENTS

| | | | | |
|---|---|---|---|---|
| 4,504,873 A * | 3/1985 | Bandy et al. | ............... | 360/63 |
| 5,313,585 A * | 5/1994 | Jeffries et al. | ............... | 711/201 |
| 5,313,626 A * | 5/1994 | Jones et al. | ............... | 714/5 |
| 5,473,761 A * | 12/1995 | Parks et al. | ............... | 711/4 |
| 5,483,641 A * | 1/1996 | Jones et al. | ............... | 710/3 |
| 5,506,977 A * | 4/1996 | Jones | ............... | 711/155 |
| 5,530,960 A * | 6/1996 | Parks et al. | ............... | 710/5 |
| 5,619,723 A * | 4/1997 | Jones et al. | ............... | 710/3 |
| 5,940,242 A * | 8/1999 | Lee | ............... | 360/78.08 |
| 6,195,221 B1 * | 2/2001 | Jung | ............... | 360/78.06 |
| 6,611,396 B1 * | 8/2003 | Kermiche et al. | ............... | 360/77.04 |

* cited by examiner

*Primary Examiner*—Stephen C Elmore
(74) *Attorney, Agent, or Firm*—Garlick Harrison & Markison; Bruse E. Stuckman

(57) ABSTRACT

A disk formatter includes an address module for creating disk block address data corresponding to a disk sector of a disk drive. A sector write module initiates a physical mode write operation to the disk sector that incorporates the corresponding disk block address data.

12 Claims, 6 Drawing Sheets

DISK FORMATTER AND METHODS FOR USE THEREWITH

CROSS REFERENCE TO RELATED PATENTS

Not applicable

BACKGROUND OF THE INVENTION

1. Technical Field of the Invention

The present invention relates to disk formatters, disk drives and related methods.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

As a magnetic hard drive is manufactured it is formatted at the factory. The formatting process typically includes at least one stage where data is read to the drive in a physical mode corresponding to the physical parameters of the drive. For example, a disk drive with 1024 cylinders, 256 heads and 63 sectors per track has (1024)×(256)×(63)=16,515,072 sectors. Each sector can be physically addressed based on its corresponding cylinder, head and sector number, e.g. cylinder 437, head 199, sector 12. A test pattern is written to, and read from, each disk sector in physical mode to determine which sectors of the disk are good and are available for storage, and which sectors are bad and should not be used.

The sectors of the disk are assigned a logical block address (LBA) that translates the physical sectors of the drive into a linear, sequentially numbered set of blocks that includes the good sectors and excludes the bad sectors. These LBA addresses are used in communicating with a host device in host interface protocols such as small computer system interface (SCSI) or serial advanced technology attachment (SATA), in order to write to or read data from the drive. In formatting the drive at the factory, the drive is completely rewritten in logical mode, using the assigned LBAs, for access by the user once the drive is installed and coupled to a host device. When a user of a host device reads data from the drive, he reads the data in logical mode. If a sector that was written in physical address mode were attempted to be read by a user in logical mode, the user would receive errors related to the block address.

A sizable market has developed for these devices and the price per unit of storage has steadily dropped. Modern host devices are provided with greater storage capacity at reduced cost, compared with devices that where manufactured a few years earlier. The need exists for provide hard drives that can be manufactured efficiently on a mass scale with reduced cost.

SUMMARY OF THE INVENTION

The present invention sets forth a disk formatter and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

The present invention provides several advantages over the prior art. In an embodiment of the present invention, a disk formatter and related methods are presented that allows disk sectors to be written in physical mode in a manner consistent with logical block addressing. In an embodiment, data that is written in physical mode can be read in logical mode without receiving errors relating to the block address.

In an embodiment of the present invention, the factory formatting of the disk drive need not rewrite the disk in logical mode. This eliminates a step in the manufacturing process, reduces the production cycle time, and lowers the overall cost of production.

Figure 1:
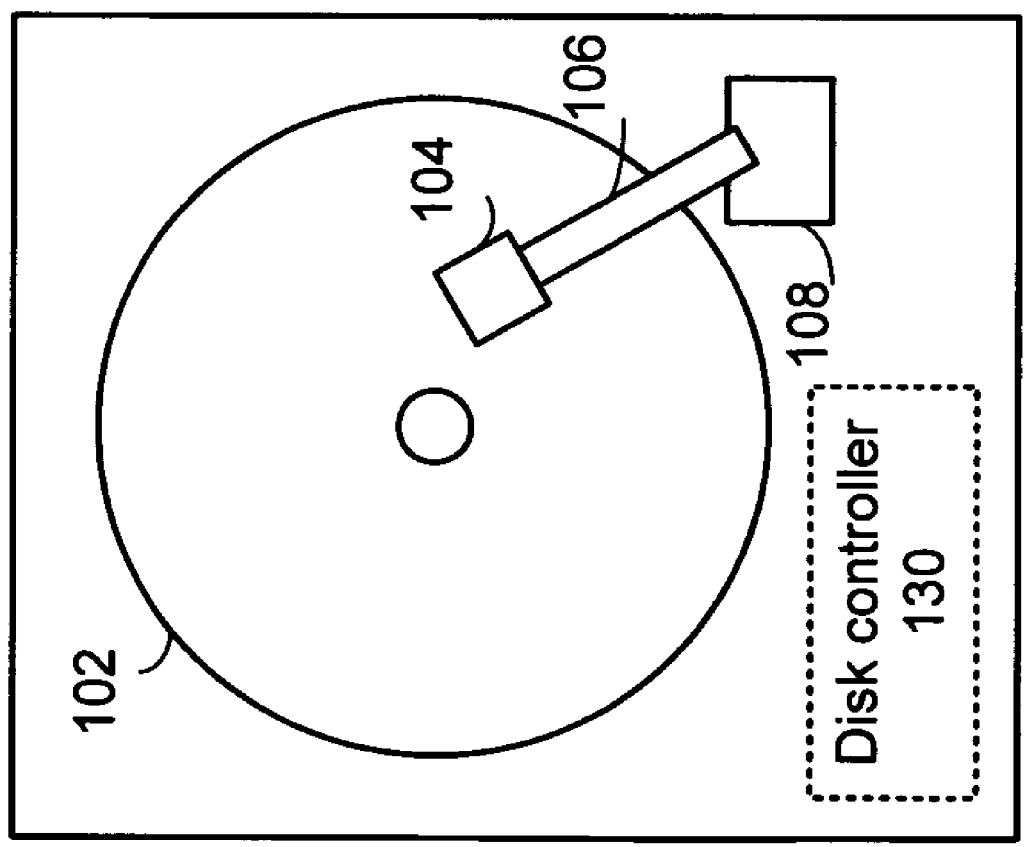
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be a rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device. Disk controller 130, provides one or more functions or features of the present invention, as described in further detail in conjunction with the figures that follow.

Figure 2:
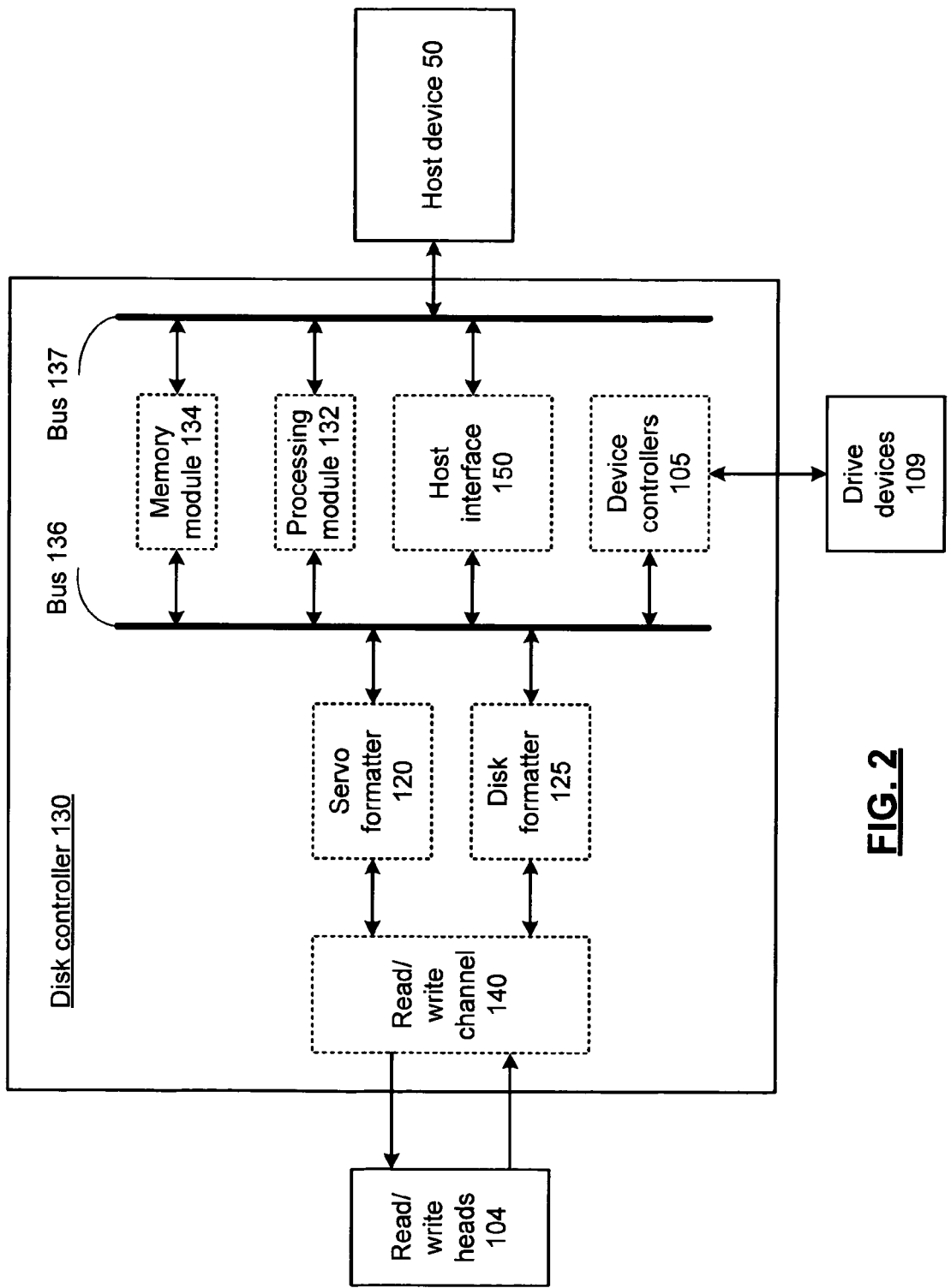
FIG. 2 presents a block diagram representation of a disk controller 130 in accordance with an embodiment of the present invention.

FIG. 2 presents a block diagram representation of a disk controller 130 in accordance with an embodiment of the present invention. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102 servo formatter 120 provides clock signals and other timing signals based on servo control data read from disk 102, device controllers 105 control the operation of drive devices 109 such as actuator 108 and the servo motor, etc. Host interface 150 receives read and write commands from host device 50 and transmits data read from disk 102 along with other control information in accordance with a host interface protocol. In an embodiment of the present invention the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing timing generator 110, processing module 132, memory module 134, read/write channel 140, disk formatter 125, servo formatter 120 and host interface 150 that are interconnected via buses 136 and 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system on a chip integrated circuit. In an embodiment of the present invention, this system on a chip integrated circuit includes a digital portion that can include additional modules such as protocol converters, linear block code encoding and decoding modules, etc., and an analog portion that includes additional modules, such as a power supply, disk drive motor amplifier, disk speed monitor, read amplifiers, etc. In a further embodiment of the present invention, the various functions and features of disk controller 130 are implemented in a plurality of integrated circuit devices that communicate and combine to perform the functionality of disk controller 130.

When the drive unit 100 is manufactured, it is formatted for the first time. Disk formatter 125 controls the formatting operation of the drive in order to implement one or more of the features and functions of the present invention, as will be described in further detail in conjunction with the figures that follow.

Figure 3:
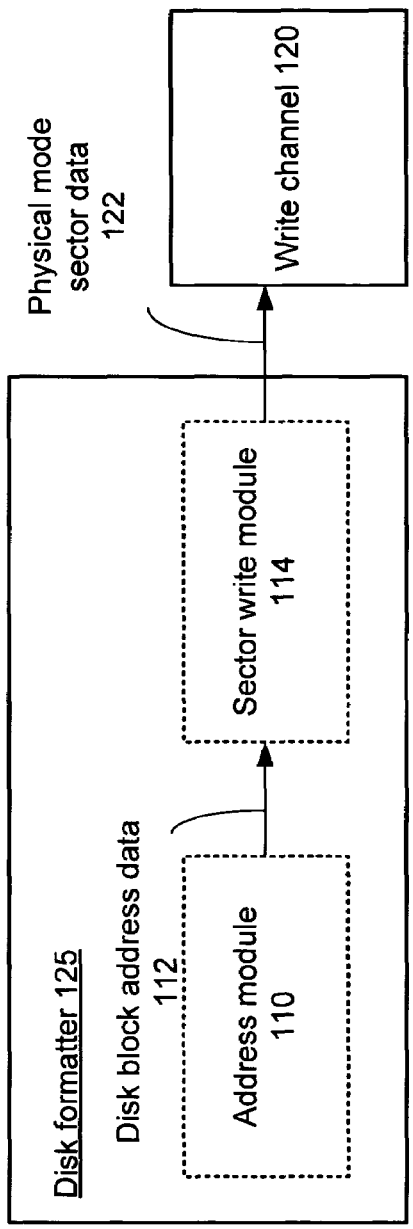
FIG. 3 presents a block diagram representation of a disk formatter 125 in accordance with an embodiment of the present invention.

FIG. 3 presents a block diagram representation of a disk formatter 125 in accordance with an embodiment of the present invention. In particular, disk formatter includes an address module 110 for creating disk block address data corresponding to a disk sector of a disk drive, such as disk drive unit 100. Sector write module 114 is operably coupled to the address module for initiating a physical mode write operation to the disk sector that incorporates the corresponding disk block address data.

In accordance with an embodiment of the present invention, the disk drive unit 100 is initially formatted as follows. Each sector of the disk 102 is written with a bit pattern, such as a 2T pattern, that can be used to test the read/write ability of the various sectors. The data from each sector of the disk is read and compared with the pattern. When unacceptable deviations are detected, this information is used to eliminate a first group of bad sectors. A second write operation is initiated to the remaining sectors (the sectors that were not eliminated during the first test) by performing a physical mode write operation to each sector. Each sector is written with data that incorporates disk block address data that contains an identifier that the sector was written in physical mode. The formatting of the disk drive unit 100 continues by reading the sector data and determining a bit error rate (BER) for each sector. If the BER for a particular sector is above a threshold, such as a threshold that is below the rate that can be reliably corrected with the error correcting code employed (e.g. a Reed Solomon code), the sector is also declared bad. A primary defect table is populated with information that is sufficient to identify each of the bad sectors and the formatting of disk drive unit 100 is competed. In particular, the good sectors of disk drive unit 100 are not rewritten in logical mode during this initial formatting. As mentioned above, this eliminates a step in the manufacturing process, reduces the production cycle time, and lowers the overall cost of production.

In an embodiment of the present invention, certain good sectors of disk drive unit 100 are set aside during the formatting process for use as a utility zone for storing drive code. This drive code is written in physical mode with a corresponding utility block address (UBA), that is incorporated into the DBA of each utility zone sector. Access to this drive code by disk controller 130 can be accomplished in physical mode. In this embodiment of the present invention, the sector of the utility zone are treated as bad sectors for the purposes of translating the sectors to logical mode addressing, because these sectors are not available for storage by the user.

In an embodiment of the present invention, the sector write module 114 initiates a physical mode write operation that incorporates the disk block address data by storing the corresponding disk block address data in the disk sector. In this fashion, n bits of the disk block address data (encoded as m encoded bits or left as n unencoded bits) are stored as part of the overhead data of the corresponding sector. In a further embodiment of the present invention, the n bits of the disk block address are used as seeds to the error correcting code algorithm used to encode and decode the sector data. In this embodiment, the disk block address data can be incorporated in the sector data, without taking up additional bits of sector overhead.

In accordance with an embodiment of the present invention, the disk drive unit is subsequently installed in conjunction with a host device 50. A logical read/write operation to a sector that was written in physical mode does not generate an address error. When a write operation is directed to virgin sector, one that has not been previously written in logical mode, the physical mode identifier of the disk block address data identifies that the sector was written in physical mode. The sector can then be written in logical mode and accessed normally from that point forward.

Figure 4:
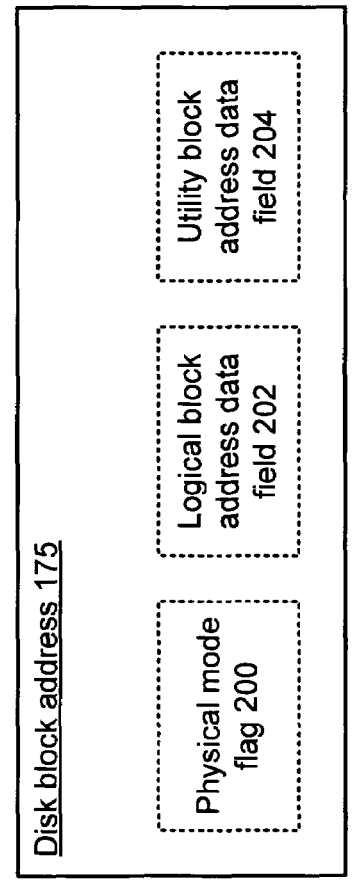
FIG. 4 presents a graphical representation of a disk block address 175 in accordance with an embodiment of the present invention.

FIG. 4 presents a graphical representation of a disk block address 175 in accordance with an embodiment of the present invention. In particular, one possible data structure for disk block address 175 is presented. In this embodiment, disk block address includes 48 bits of data (four 12-bit symbols). The most significant bit is reserved for a physical mode flag field for storing physical mode flag 200 that has a first value if the disk sector is written in physical mode and another value if the disk sector is written in another mode, such as logical mode. The disk block address 175 also includes a logical block address data field 202 of the disk sector. The disk block address 175 further includes a utility block address data field of the sector. While this description presents one possible data structure for disk block address 175, other data structures using greater or fewer numbers of bits, alternative partitioning including greater or lesser data fields are likewise possible within the broad scope of the present invention. In an embodiment of the present invention that does not employ a utility zone, the second data field 203 can be omitted.

During a formatting operation when sectors of disk 102 are written in physical mode, sector write module 114 initiates the physical mode write operation to the disk sector with a DBA 175 wherein the physical mode flag 200 is set to a physical mode value, the logical block address data field 202 stores a default value, and the utility block address data field 204 stores a default value, because it has not yet been determined if the if the sector is destined to become a "bad sector" that has no translated logical block address, a "good sector" with a corresponding the logical block address or part of the utility zone.

If the sector is subsequently written as part of an operation of writing drive code or other data to a utility zone, a utility block address that corresponds to that sector is determined and stored in second data field 203. The utility block address for the sector can be any data field that can be used to address the particular sectors that are a part of the utility zone. In an embodiment of the present invention, the utility block address includes the physical mode address of the particular sector. While the description above discussions initially storing a default value in the utility block address data field, in an alternative embodiment of the present invention the physical mode address may be stored in the utility mode address data field during formatting.

If the sector is subsequently written as part of a normal write operation on behalf of a host device 50 in logical mode, a logical block address that corresponds to that sector is determined and stored in logical block address data field 202. The logical block address for the sector can be determined based on the file system, such as file allocation table (FAT) or new technology file system (NTFS) that is employed, along with the particular host interface protocol, such as SCSI, SATA, etc, as will be understood by one skilled in the art when presented the present disclosure.

While the foregoing description includes a physical mode flag 200 with one or more bits that stores a value that indicates whether the sector was written in physical mode or some other mode such a logical mode, other indicators representing some or all bits of disk block address 175 such as a pattern of all 1's, all 0's, an alternating patterns of 1's and 0's, or some other word or pattern could likewise be used in conjunction with the broad scope of the present invention.

While the foregoing description discusses the formatting of disk drive unit 100 during initial formatting as part of the factory setup and initialization of the drive, subsequent formatting operations of disk drive unit 100 can also be carried out in accordance with the present invention.

Figure 5:
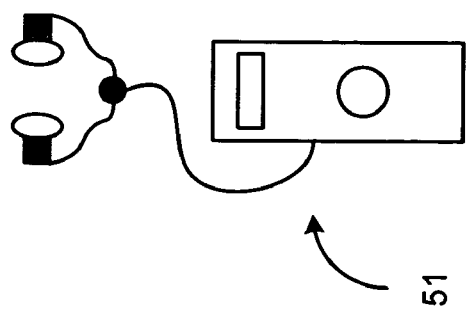
FIG. 5 presents a pictorial representation of a handheld audio unit 51 in accordance with an embodiment of the present invention.

FIG. 5 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 6:
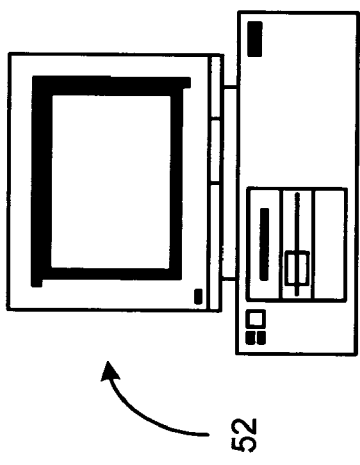
FIG. 6 presents a pictorial representation of a computer 52 in accordance with an embodiment of the present invention.

FIG. 6 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 7:
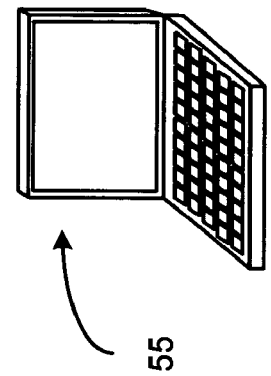
FIG. 7 presents a pictorial representation of a wireless communication device 53 in accordance with an embodiment of the present invention.

FIG. 7 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 8:
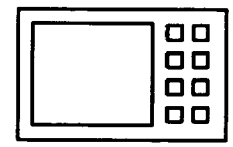
FIG. 8 presents a pictorial representation of a personal digital assistant 54 in accordance with an embodiment of the present invention.

FIG. 8 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 9:
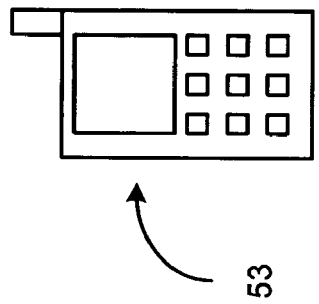
FIG. 9 presents a pictorial representation of a laptop computer 55 in accordance with an embodiment of the present invention.

FIG. 9 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 10:
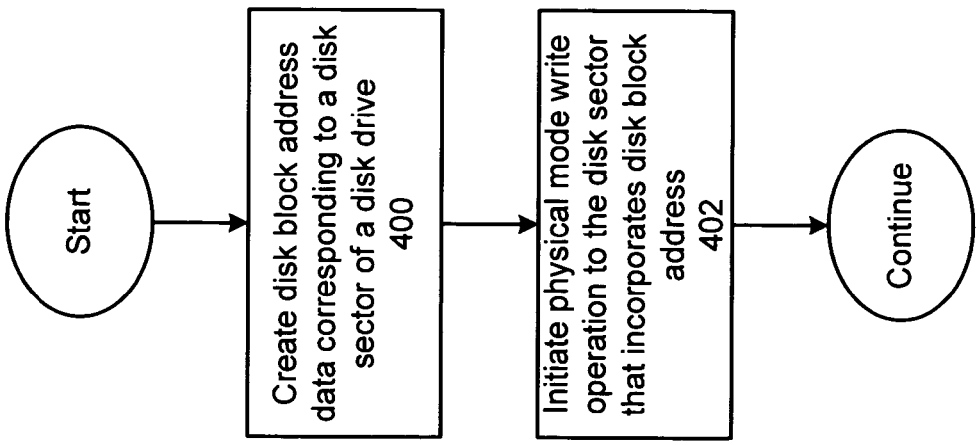
FIG. 10 presents a flowchart representation of a method in accordance with an embodiment of the present invention.

FIG. 10 presents a flowchart representation of a method in accordance with an embodiment of the present invention. In particular, a method is presented that can be used in conjunction with one or more of the features or functions described in association with FIGS. 1-9. In step 400, disk block address data are created corresponding to a disk sector of a disk drive. In step 402, a physical mode write operation is initiated to the disk sector that incorporates the corresponding disk block address data.

In an embodiment of the present invention the corresponding disk block address data includes a value that indicates that the disk sector was written in physical mode. In an embodiment, the value that indicates that the disk sector was written in physical mode includes a physical mode flag field that has a first value if the disk sector is written in physical mode and at least one other value if the disk sector is written in another mode. However, other values or indicators may be used as previously described.

In an embodiment of the present invention, step 400 includes creating a logical block address data field, and creating a utility block address data field. In an embodiment, step 402 includes storing either a logical block address of the disk sector or a default value in the logical block address data field, and storing either a utility block address of the disk sector or a default value in the utility block address data field. In an embodiment of the present invention, the step of initiating a physical mode write operation includes storing the corresponding disk block address data in the disk sector, provided however that indirect storage of the disk block address may also be employed as previously described.

Figure 11:
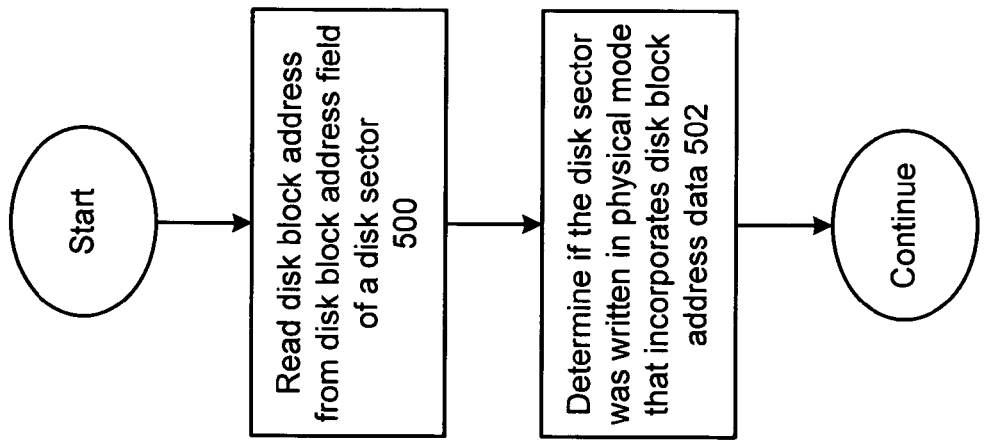
FIG. 11 presents a flowchart representation of a method in accordance with an embodiment of the present invention.

FIG. 11 presents a flowchart representation of a method in accordance with an embodiment of the present invention. In particular, a method is presented that can be used in conjunction with one or more of the features or functions described in association with FIGS. 1-10. In step 500, disk block address data is read from a disk block address field of a disk sector of a disk drive. In step 502, the method determines if the disk sector was written in physical mode, based on the disk block address data.

In an embodiment of the present invention, step 502 includes determining if the disk block address data includes a value that indicates that the disk sector was written in physical mode. In an embodiment, step 502 includes determining if the disk block address data includes a physical mode flag field that has a first value if the disk sector is written in physical mode and at least one other value if the disk sector is written in another mode.

Figure 12:
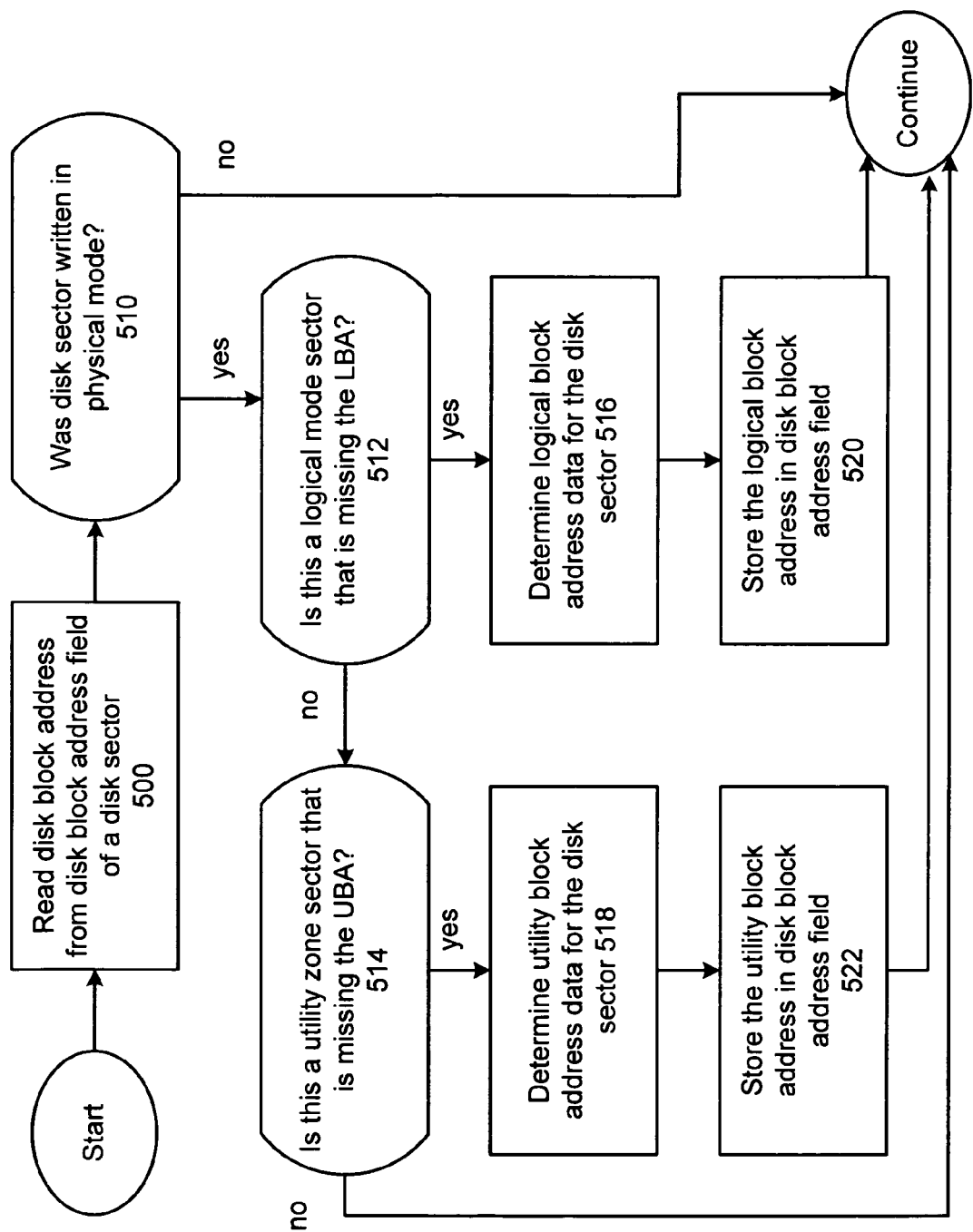
FIG. 12 presents a flowchart representation of a method in accordance with an embodiment of the present invention.

FIG. 12 presents a flowchart representation of a method in accordance with an embodiment of the present invention. In particular, a method is presented that can be used in conjunction with one or more of the features or functions described in association with FIGS. 1-11. In step 500, disk block address data is read from a disk block address field of a disk sector of a disk drive. In step 510, the method determines if the disk sector was written in physical mode, based on the disk block address data, if not the method continues. In an embodiment of the present invention, step 510 includes determining if the disk block address data includes a value that indicates that the disk sector was written in physical mode. In an embodiment, step 510 includes determining if the disk block address data includes a physical mode flag field that has a first value if the disk sector is written in physical mode and at least one other value if the disk sector is written in another mode.

If the disk sector was written in physical mode, the method proceeds to step 512 to determine if the sector is a LBA sector that is missing the LBA. For instance, a disk controller is attempting a read/write operation in logical mode to a sector that was written in physical mode. In this example, the logical block address data field may contain a default value. If so, the method proceeds to step 516 where the method determines a logical block address data for the disk sector. The method continues with step 520 where the logical block address data is stored in the disk block address field. In addition, in the embodiment wherein the disk block address data includes a physical mode flag field that has a first value if the disk sector is written in physical mode and at least one other value if the disk sector is written in another mode—the physical mode flag is reset so that subsequent read/write operations to the sector will proceed normally in logical mode.

If step 512 determined that the sector is not an LBA sector, the method proceeds to step 514 to determine if the sector is a utility zone sector that is missing the UBA. For instance, a disk controller is attempting a read/write operation in physical mode to a sector that is part of the utility zone that may contain a default value for in the utility block address data field if it is being accessed for the first time. If so, the method proceeds to step 518 by determining a utility block address data for the disk sector. The method proceeds to step 522 by storing the utility block address data in the disk block address field. If, in step 514, the method determines that this is a utility zone sector that is not missing its UBA, the method continues.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a memory and a processing system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method comprising:
   creating disk block address data corresponding to a disk sector of a disk drive wherein the disk block address data includes a value that indicates that the disk sector was written in physical mode; and
   initiating a physical mode write operation to the disk sector that incorporates the corresponding disk block address data.

2. The method of claim 1 wherein the step of creating disk block address data corresponding disk block address data includes creating a logical block address data field.

3. The method of claim 2 wherein the step of creating disk block address data corresponding disk block address data includes storing in the logical block address data field one of: a logical block address, and a default value.

4. The method of claim 1 wherein the step of creating disk block address data includes creating a utility block address data field.

5. The method of claim 4 wherein the step of creating disk block address data corresponding disk block address data includes storing in the utility block address data field one of: a utility block address, and a default value.

6. The method of claim 1 wherein the value that indicates that the disk sector was written in physical mode includes a physical mode flag field that has a first value if the disk sector is written in physical mode and at least one other value if the disk sector is written in another mode.

7. The method of claim 1 wherein the step of initiating a physical mode write operation includes storing the corresponding disk block address data in the disk sector.

8. A method comprising:
   reading disk block address data from a disk block address field of a disk sector of a disk drive; and
   determining if the disk sector was written in physical mode, based on the disk block address data.

9. The method of claim 8 further comprising:
   determining logical block address data for the disk sector; and
   storing the logical block address data in the disk block address field.

10. The method of claim 8 further comprising: determining utility block address data for the disk sector; and
    storing the utility block address data in the disk block address field.

11. The method of claim 8 wherein the step of determining if the disk sector was written in physical mode includes determining if the disk block address data includes a value that indicates that the disk sector was written in physical mode.

12. The method of claim 8 wherein determining if the disk sector was written in physical mode includes determining if the disk block address data includes a physical mode flag field that has a first value if the disk sector is written in physical mode and at least one other value if the disk sector is written in another mode.

* * * * *

UNITED STATES PATENT AND TRADEMARK OFFICE
CERTIFICATE OF CORRECTION

PATENT NO. : 7,461,197 B2 Page 1 of 1
APPLICATION NO. : 11/311728
DATED : December 2, 2008
INVENTOR(S) : Bob R. Southerland et al.

It is certified that error appears in the above-identified patent and that said Letters Patent is hereby corrected as shown below:

On the Title Page, Item (74): replace "Bruse E. Stuckman" with --Bruce E. Stuckman--.

Signed and Sealed this

Twenty-third Day of June, 2009

JOHN DOLL
*Acting Director of the United States Patent and Trademark Office*